United States Patent [19]

Granville, deceased

[11] 3,728,911

[45] Apr. 24, 1973

[54] INFINITELY VARIABLE SPEED TRANSMISSIONS

[76] Inventor: William Francis Granville, deceased, late of 85 Howdale Road, Dowham Market, Norfolk, England Winifred Mary Granville, executrix

[22] Filed: Mar. 17, 1971

[21] Appl. No.: 124,904

[30]  Foreign Application Priority Data

Aug. 13, 1970 Great Britain...................39,131/70

[52] U.S. Cl...............................................74/752 F
[51] Int. Cl...............................................F16h 3/74
[58] Field of Search........................74/752 F, 752 A

[56]  References Cited

UNITED STATES PATENTS

| | | | |
|---|---|---|---|
| 2,157,352 | 5/1939 | Shaw | 74/752 F |
| 1,864,824 | 6/1932 | Hobbs | 74/752 F |
| 2,046,346 | 7/1936 | Shaw | 74/752 F |
| 2,077,556 | 4/1937 | Gaston | 74/752 F |
| 2,082,444 | 6/1937 | Dodge | 74/752 F |
| 2,231,784 | 2/1941 | Von Thungen | 74/802 |
| 2,476,245 | 7/1949 | Lewis | 74/752 F |
| 2,564,211 | 8/1951 | O'Hara | 74/752 F |
| 3,075,409 | 1/1963 | Amsler | 74/752 F X |
| 3,447,398 | 6/1969 | Hsin Sheng Chen | 74/752 F |

*Primary Examiner*—Leonard H. Gerin
*Attorney*—Woodhams, Blanchard & Flynn

[57]  ABSTRACT

The invention relates to an infinitely variable speed transmission comprising an input shaft mounting a first sun wheel and an output shaft coaxial with the input shaft and mounting a second sun wheel, a pair of diametrically disposed planet assemblies being provided each comprising a first planet pinion, mounted on a shaft which is parallel to the input and output shafts, in co-operative connection with the first sunwheel, and a second planet pinion on the shaft which is in turn in co-operative connection with the second sun wheel, and a centrifugal fly-weight mounted on the shaft, the two centrifugal fly-weights of each assembly being oppositely disposed so that on rotation of the input shaft a drive comprising of only positive impulses is imposed on the output shaft.

10 Claims, 10 Drawing Figures

PATENTED APR 24 1973

3,728,911

INVENTOR
WILLIAM FRANCIS GRANVILLE
BY
Woodhams, Blanchard & Flynn
ATTORNEYS

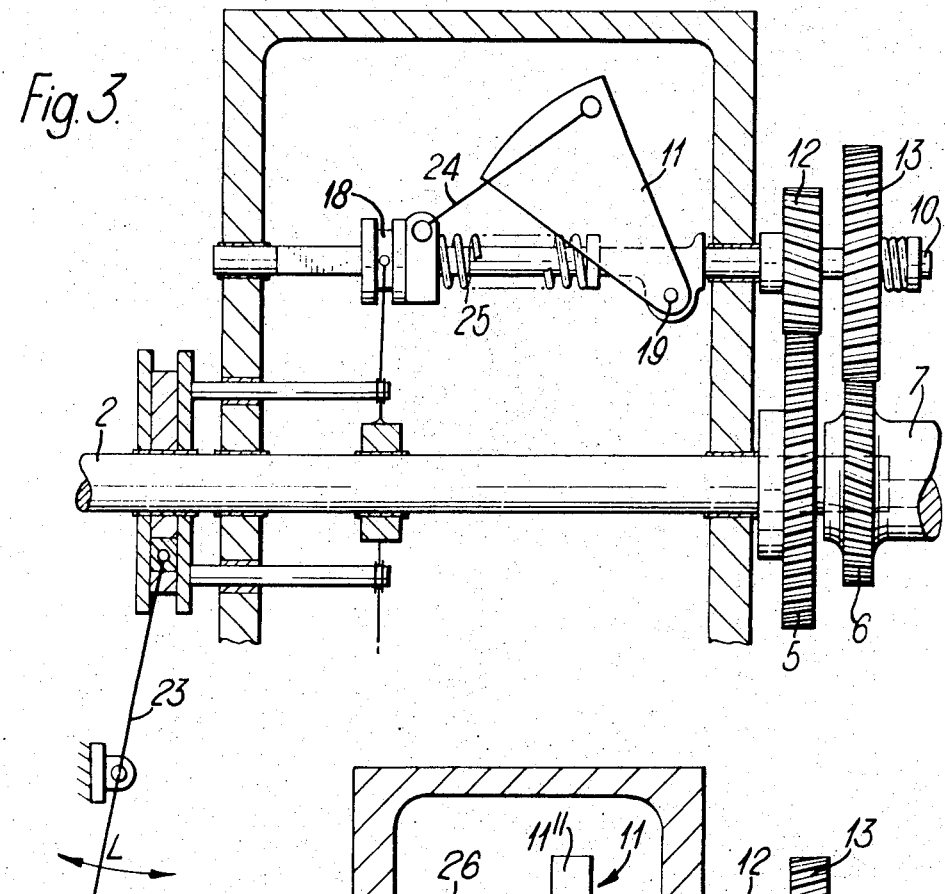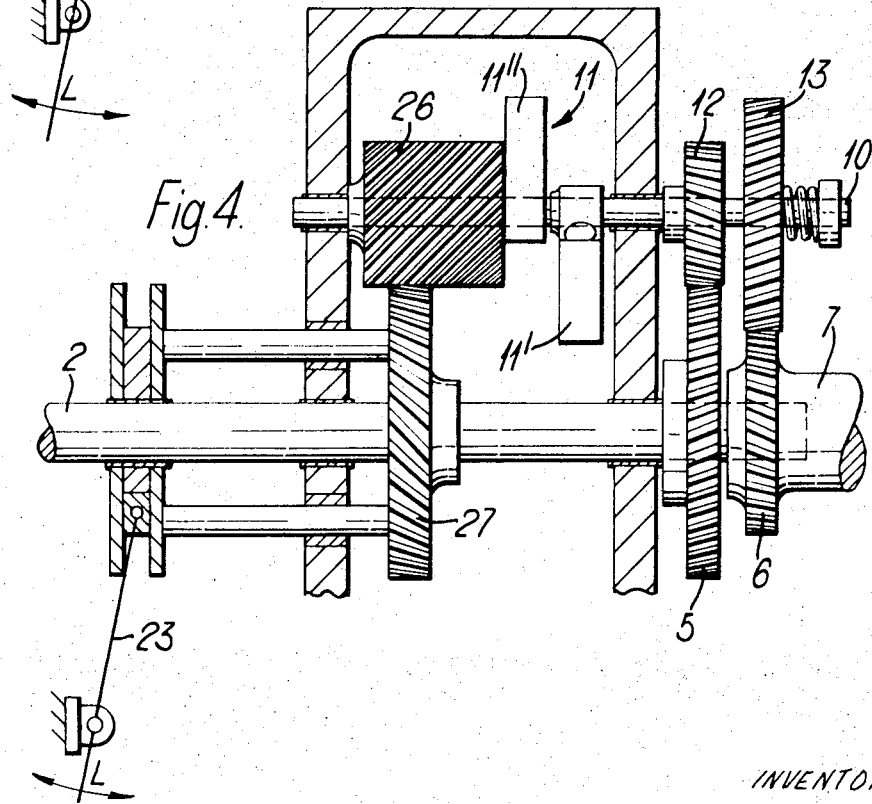

PATENTED APR 24 1973

INVENTOR
WILLIAM FRANCIS GRANVILLE
BY
Woodhams, Blanchard & Flynn
ATTORNEYS

INVENTOR
WILLIAM FRANCIS GRANVILLE

INVENTOR
WILLIAM FRANCIS GRANVILLE
BY
Woodhams, Blanchard & Flynn
ATTORNEYS

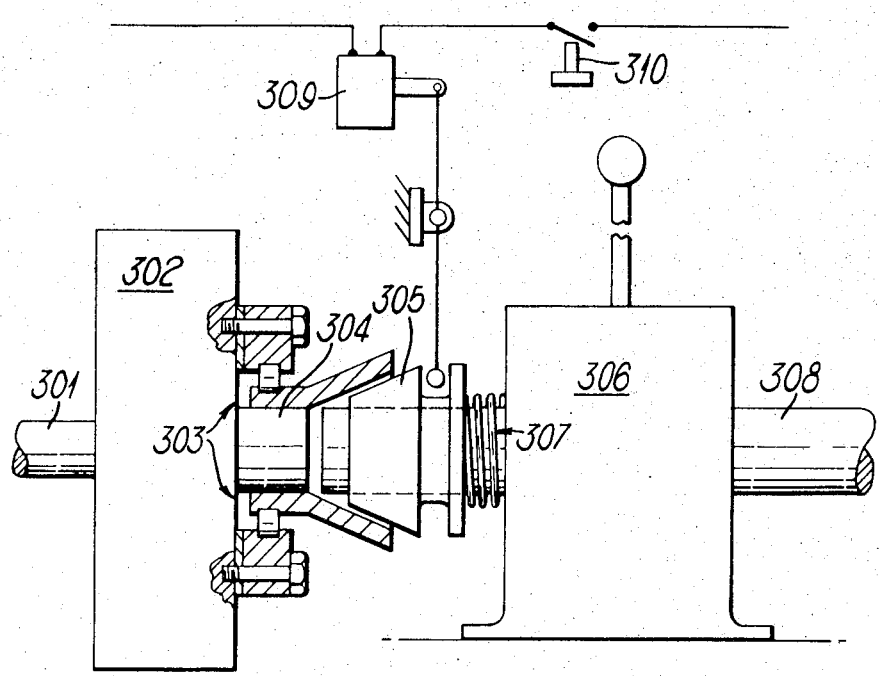

INFINITELY VARIABLE SPEED TRANSMISSIONS

The invention relates to infinitely variable speed transmissions for vehicles and installations incorporating such transmissions, and to a reversing gear therefor.

The invention is directed to planetary transmissions of the kind incorporating sun wheels having co-operating planet pinions. Such planetary, or epicyclic, transmissions are generally known. Such transmissions are of relatively simple construction.

As will be understood, a planetary transmission of the kind described virtually embodies no friction coupling in all of its speeds and requires no gear shifting since all of the gears remain in mesh continuously.

According to the invention there is provided an infinitely variable speed transmission comprising an input shaft mounting a first sun wheel and an output shaft coaxial with the input shaft and mounting a second sun wheel, a pair of diametrically disposed planet assemblies being provided each comprising a first planet pinion, mounted on a shaft which is parallel to the input and output shafts, in co-operative connection with the first sun-wheel, and a second planet pinion on the shaft which is in turn in co-operative connection with the second sun wheel, and a centrifugal fly-weight mounted on the shaft, the two centrifugal fly-weights of each assembly being oppositely disposed so that on rotation of the input shaft a drive comprising of only positive impulses is imposed on the output shaft.

Preferably two pairs of planet assemblies may be provided so that there are four assemblies disposed symmetrically at 90° radius apart with respect to the sun wheels.

The second planet pinion may be loaded under the pressure of a spring bearing against the second planet pinion and the inside of a ball bearing race in which the shaft is mounted.

Furthermore, each centrifugal fly-weight may be adjustable to provide a controllable working radius of the weight.

There may be a clutch member mounted on the input shaft and capable of axial sliding motion relative thereto and means to reciprocate the clutch member between a first and a second operative position so that the output shaft is driven in a forward or reverse direction relative to the input shaft.

Suitably the means to reciprocate the clutch member may comprise pairs of oppositely acting solenoid members.

Alternatively the means to reciprocate the clutch member may comprise hydraulic or pneumatic control members.

The clutch member may suitably be operatively connected with the reciprocating means via a control member which is secured to the clutch member and is capable of longitudinal reciprocable motion, and is also connected by a pressure equalising member with an operation element of the reciprocating means, for example a core of a solenoid.

There may suitably be four reciprocating means spaced at an equal radial distance from the axis of the input shaft, each reciprocating means having an associated control member.

The inveniton thus provides for the transmission of speed from one shaft to another in such manner that there is a continuous or infinite variation of speed and torque ratio, which therefore changes automatically in accordance with variation in the torque load and for stroke of input shaft speed.

Several embodiments of the invention are diagrammatically illustrated, by way of example, in the accompanying drawings, in which:

FIGS. 3, 4 and 5 show three ways in which the working radius of the centrifugal fly-weight may be altered;

FIG. 10 shows an application of the transmission to a motor car.

Figure 1:
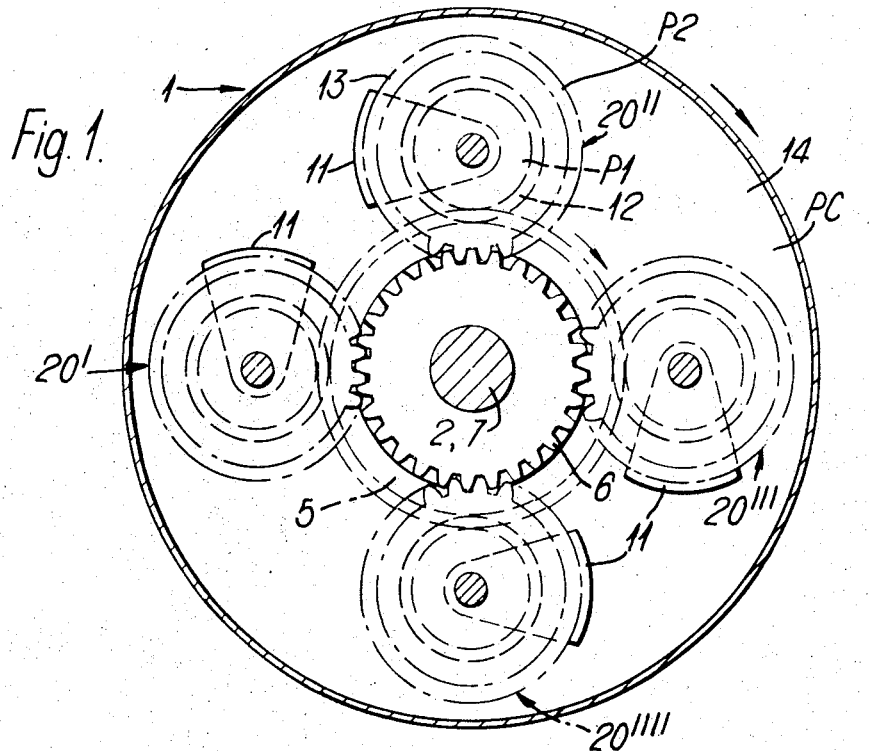
FIG. 1 shows an end elevation of the moving parts of one embodiment of infinitely variable speed transmission according to the invention.
Figure 2:
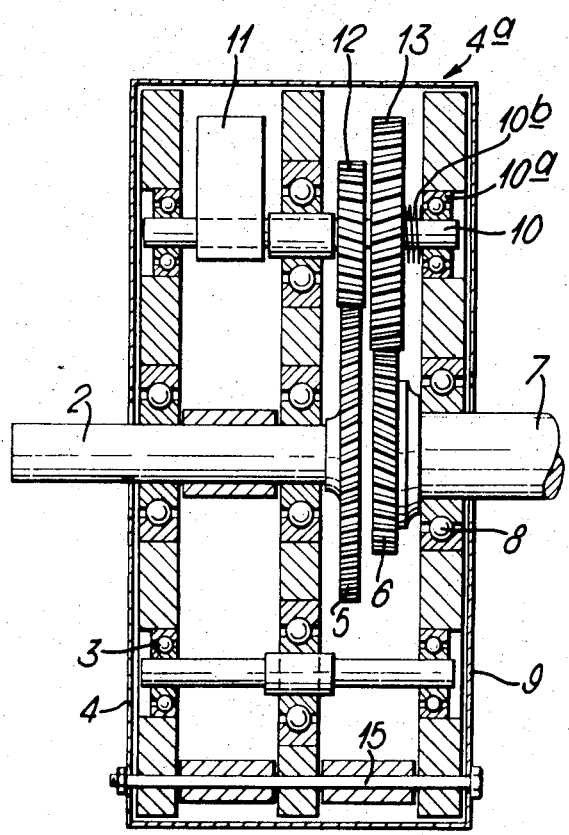
FIG. 2 shows a longitudinal sectional view of the embodiment of FIG. 1, showing, for clarity, only one planetary assembly with case enclosing the transmission.

Referring first to FIGS. 1 and 2, the infinitely variable speed transmission 1 has an input or drive shaft 2 mounted in bearings 3 in a front plate 4 of a casing 4a for the transmission. A main sun wheel 5 is keyed to the inner end of the drive shaft 2.

A second sun wheel 6, which is independent of and spaced from the sun wheel 5, is integral with the inner end of an output shaft 7, which is itself mounted in bearings 8 in a rear cover plate 9 of the casing 4a. The shafts 2 and 7 are coaxial. Shafts 10 parallel to the input and output shafts are mounted in bearings in the front and rear plates. Each shaft 10 has integral therewith a centrifugal fly-weight 11, a planetary pinion 12 and a planetary pinion 13. The teeth of the planetary pinion 12 intermesh with the teeth of the main sun wheel 5, while the teeth of planetary pinion 13 intermesh with the teeth of the sun wheel 6. A compression spring 10b is mounted on the shaft 10 and bears against the inside of a bearing race 10a for the shaft, and the planet pinion 13. The wheels and pinions 5, 6, 12 and 13 have helically cut teeth, and the pinion 13 is slidable by the spring 10b along the shaft 10, which is splined adjacent the wheel 13 for this purpose.

The four centrifugal fly-weights 11 are disposed on and are integral with their respective shafts 10 as shown in FIGS. 1 and 2.

The centrifugal fly-weight and the two planetary pinions on one shaft 10 thus form a planetary unit. There are four such units, namely 20', 20'', 20''' and 20'''', spaced equidistantly at 90° radial spacing around the circumference of the sun wheels.

The units 20' to 20'''' thus provide diametrically opposed pairs as shown in FIG. 1. The centrifugal fly-weights 11 in each opposed pair are so mounted on their respective shaft 10 that their effective masses are opposed. In operation dynamic balance is therefore obtained. There is also a planet carrier 14 rotatably mounted on the shafts 1 and 2 and carrying the planet pinions. The front, centre and back plates of the carrier 14 are secured together by bars 15 as in FIG. 2.

In the embodiment shown the main sun wheel 5 has 40 teeth, the second sun pinion 6 has 28 teeth, the planetary pinion 13 has 32 teeth, and the planetary pinion 12 has 20 teeth.

In use other ratios may of course be utilised and referring to FIG. 1, it is first assumed that the output shaft 7 is held stationary by for example a brake (not shown). On rotation of the input shaft 2, the planet carrier 14 rotates in the same sense at a greater speed than the input shaft 2 due to the gear ratios employed. As this rotation takes place the centrifugal fly-weight 11 of the planetary unit 20' rotates from its outermost to its innermost position, that is to say from a position in which its mass is direkted away from the input shaft to a position in which its mass is directed towards the input shaft. This movement creates a centrifugal force which causes a tooth of the planetary pinion 13 to exert a force on a tooth of the sun wheel 6. A torque is thereby created which is a static torque attempting to rotate the output shaft 7. Correspondingly, there is an opposite reaction on the planet carrier 14 which is potentially effective to rotate the planet carrier in the opposite sense.

Similar forces and torques are being produced in the planetary unit 20''', diametrically opposed to the unit 20'.

Considering the forces and torques which are generated in the other pair of planetary units 20'' and 20'''', it will be understood that in this pair the centrifugal fly-weights 11 are moving from their innermost to their outermost positions, and the centrifugal forces produced are directed in the opposite direction. If these forces were not controlled, they would transmit a negative force to the sun wheel 6. This undesirable effect is obviated when, during rotation of the pinions, a tooth of planetary pinion 12 just engages a tooth of the sun wheel 5. As this sun wheel 5 is the driving wheel and is secured to the input shaft 2, as rotation is continued the teeth in engagement are carried away from each other, thus negating the negative force between the teeth. The input shaft 2 therefore in effect controls the outward movement of each centrifugal fly-weight 11 and only positive forces are imposed on the output shaft 7 through the planetary pinion 13 meshing with the sun wheel 6.

It can thus be seen that the planetary units act in pairs, units 20' and 20''' forming one pair and units 20'' and 20'''' forming the other pair.

All the centrifugal fly-weights 11 are subjected to centrifugal force while the mechanism is in motion but, for instance, the pair 20'' and 20'''' while moving from its outermost to its innermost position produces a positive impulse on the output shaft which is of a sinusoidal character, while the pair 20' and 20''' are on their outward movement from the innermost to the outermost position controlled by the driving wheel 5. Therefore, only the positive impulses take effect on the sun wheel 6.

It will also be observed that the wheel 5 provides the energy required to rotate the planet carrier 14.

Although the centrifugal fly-weights produce alternating positive and negative impulses of a sinusoidal character during one revolution, the negative impulses are neutralised and only the positive impulses take effect upon the output shaft.

As the centrifugal fly-weights are equal and opposite in each opposed pair of planetary units, there is dynamic balance in the entire transmission.

Turing now to FIG. 2, the teeth of the pinion 13 are helical and of opposite hand to the helical teeth of the wheel 6 and maintain a tooth pressure on the teeth of the wheel 6 which is secured to the output shaft 7. Moreover, potential movement by the action of the spring 10b causes the teeth of the pinion 13 and the teeth of the wheel 12 to have an opposite sense of directional rotation thereby producing a load on the teeth of the main sun wheel 5 teeth while the pinion 13 imposes a load on the wheel 6 which is in the opposite direction to that on the helical wheel 5.

Therefore the wheel 5 has the double function of first, providing the drive for the entire mechanism and secondly to control the outward motion of the centrifugal fly-weight 11 while under the influence of centrifugal force and thereby neutralize its tendency to produce a negative impulse on the output shaft 7.

Any other gear ratios can be used provided that when the output shaft is held stationary and the input shaft is in motion that the planet carrier is rotating at a greater speed than the input shaft speed.

Moreover, the transmission and reverse gear may be applied to lorries or to any other application where an infinitely variable transmission is required.

Since each planetary unit has its own compression spring equality of load sharing among the four planet units is attained.

Also, the tooth contacts help to minimise any noise which the gear teeth might produce.

Now, dealing with the transmission when running in the top gear, or the one to one ratio, the entire mechanism is rotating in bloc or solid motion; there is no movement within the case and the input and output shafts can now be regarded as being one shaft throughout its complete length.

The results of a test run are given in the following Example:

EXAMPLE

The input shaft 2 was driven by a ¼ H.P. motor made about 1930 and has the specification of that particular time, 50 cycles, 240 volt single phase/split phase squirrel cage electric motor (not shown). A coupling (also not shown) connected the motor drive shaft to the input shaft 2, and a brake drum was secured to the output shaft 7. A belt drive was taken from the output shaft to a generator which was in turn connected to an electrical Tachometer.

The motor was switched on to rotate the input shaft 2 and the brake having a friction material lining, was applied to the output shaft 7 to impose a load on that shaft which was the maximum the gear is able to carry while maintaining a 1:1 ratio between input and output shafts. The tachometer was then reading approximately 1,420 r.p.m. In this condition of running the transmission, the torque load on the output shaft was measured by a simple spring balance. The reading was 1¼ lbs. As the effective length of the brake arm was 7 inches, the torque was 1¼ × 7 = 8¾ lb. ins.

The brake was then adjusted to impose the load which held the output shaft in an "at rest" or "stalled" position. The spring balance read 2¼ lbs. to give a static torque of 15¾ lb. ins.

The brake is infinitely adjustable, between the two extreme conditiots desdrhed; to give the general result that a small increase in the brake load causes a corresponding small decrease in the rate of rotation (r.p.m.) of the output shaft, and this is accompanied by a small increase in the output torque.

Thus the torque grows as the output speed falls.

Turning now to FIG. 3, the centrifugal fly-weight 11 comprises a pair of weights mounted as a pair one on each side of the shaft 10. Both weights are secured in the mounting 19. The sleeve 18 is secured to the centrifugal fly-weight by a strap 24. The sleeve 18 is mounted on a splined or square section of the shaft 10. A compression spring 25 is mounted between a stop on the shaft 10 and the sleeve 18 to partly neutralise end thrusts. Movement of the lever 23 controls the fly-weight as described above.

It is important to note that the centre of gravity of the centrifugal fly-weight 11 is adjustable between an innermost, or zero, position and an outer maximum position in relation to the shaft 10.

The embodiment shown in FIG. 4 differs from that shown in FIGS. 2 and 3, in that the centrifugal fly-weight 11 comprises two fly-weights 11' and 11". The fly-weight 11' is keyed to the shaft 10, while the fly-weight 11" is secured to a helical pinion 26. The pinion 26 and the fly-weight 11" have a close-sliding fit on the shaft 10. The pinion 26 meshes with a pinion 27 which is slidable on splines or on a spiral helix on the shaft 2. The pinion 27 is connected to the lever 23.

This embodiment provides a rotational movement of the centrifugal fly-weight 11" related to the centrifugal fly-weight 11' between the position shown, and a position in which the fly-weight 11" is rotated through 180°. Thus control of the working radius of the fly-weight 11 is obtained. In the position shown, the fly-weight 11 has effectively zero working radius as the fly-weight 11" counter-balances the fly-weight 11'. The fly-weight 11" is rotated by sliding the pinion 27 through an infinite number of steps along the shaft 2, the sliding motion being effective to rotate the pinion 26 and thus the fly-weight 11".

Figure 5:
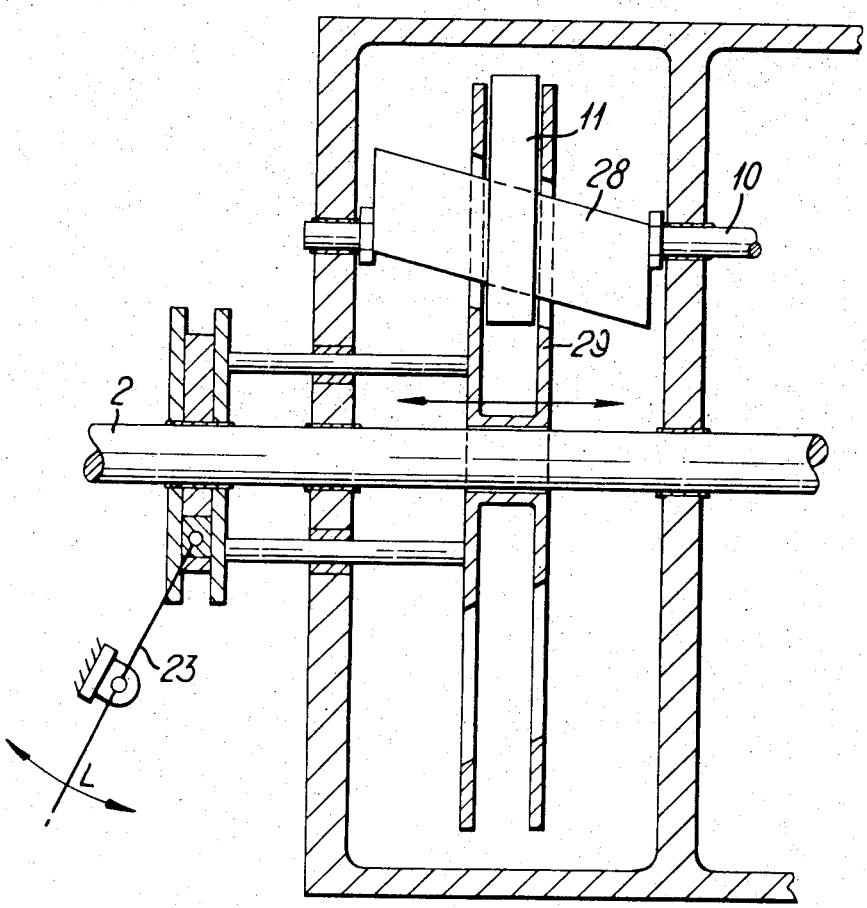

Referring now to FIG. 5, the centrifugal fly-weight 11 is circular and of suitable diameter and thickness and is mounted on an inclined shaft 28 forming part of the shaft 10. The shaft 28 passes through an inclined bore in the centrifugal fly-weight. The fly-weight 11 is mounted as a close-sliding and rotating fit in a number 29 which rotates with the planet carrier 14 (FIG. 1) and is slidable on the shaft 2. The member 29 is connected to the lever 23. The shaft 28 passes through elongate holes in external walls of the member 29. Shaft 10 also passes through holes (not shown) in the member 29.

The member 29 maintains the centrifugal fly-weight 11 at 90° to the axis of the shaft 2. Actuation of the lever 23 reciprocated the member 29 along the shaft 2, thereby causing the centrifugal fly-weight 11 to move inwardly or outwardly relative to the axis of the shaft 2, and is effectively altering the working radius of the fly-weight.

It is to be understood that movement of the lever 23 controls the position of all of the centrifugal fly-weights 11 in the transmission so that dynamic balance is maintained.

Referring now to FIGS. 6 to 9 a reversing gear is shown in which there is an input shaft 100 on which is mounted a sun wheel 1', and an output shaft 103. The axes of the shafts 100 and 103 are co-linear mounting a toothed annular gear wheel 103'. A planetary cage 104 mounts opposed pairs of planetary pinions 102 and 102' on axles 102", the longitudinal axes of which are parallel to that of the input shaft 100. The planetary pinions 102 mesh with the sun wheel 1' and the planetary pinions 102' mesh with the annular gear wheel 103'. The planetary cage 104 includes an integral extension 104' which has a fit on the input shaft 100.

The extension 104' includes splines (indicated in dotted lines in FIG. 6) which engage with complementary splines of a double faced cone clutch member 105. The clutch member 105 is able to slide in a longitudinal direction relative to the extension 104', but cannot rotate independently of the extension 104'.

A surface 105' of the cone clutch member is mounted via a combined radial and thrust bearing 106 to a ring 106', which cannot itself rotate but may cooperate with the clutch member 105 to provide either a forward or reverse motion of the output shaft 103. The ring 106 is constrained radially relative to the input shaft by means of a combined radial and thrust ball bearing which is mounted on the extension 104' of the clutch member 105.

The ring 106' can be connected to a surrounding member 107 by four single or double flexible metal straps 108 or alternatively by the member 106' having gear teeth engaging with similar teeth cut in the surrounding member 107.

Either of the two methods described can be used to prevent rotation of the member 106', and the ball bearing 106 would provide complete rotational isolation while the clutch member 105 is in motion.

Figure 8:
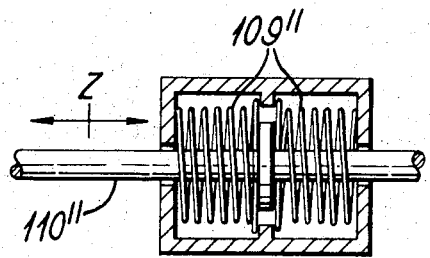
FIG. 8 shows a schematic section of an operative member of the gear box shown in FIG. 6.
Figure 9:
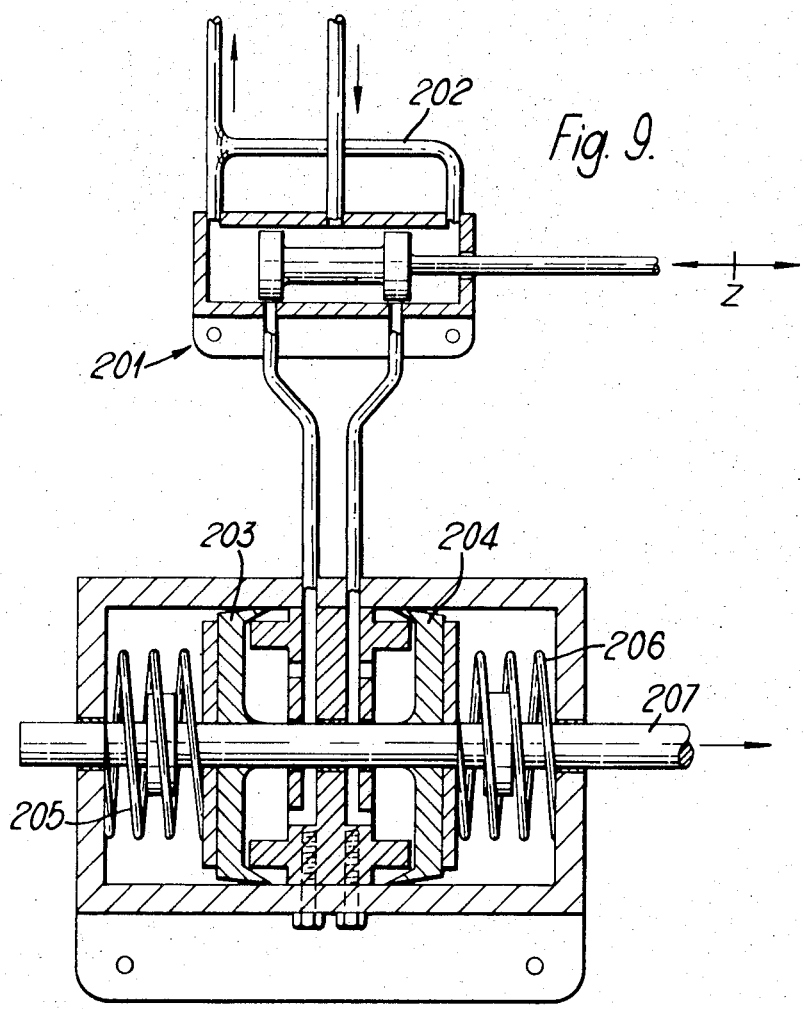
FIG. 9 shows a hydraulic actuator for the reversing gear shown in FIG. 6.

The bearing ring 106' includes four holes or seatings which are equidistantly spaced at 90° on a circle coaxial with the axis of the input shaft 101. One spring loaded operative member 109 or 109' is mounted in each seating, the members 109 and 109' being disposed mutually spaced apart by 180°. Each operative member is associated with the core of a solenoid 110 or 110' which actuate the members 109 and 109'. As shown in FIG. 8, the members 109 and 109' include a housing seating two compression springs 109" a core 110" of the solenoid passing through the spring. The core 110" is locked by bolts to the ring 106'.

The members 109 and 109' are operative to centralise the cone clutch member 105 in a neutral position when not actuated by the associated solenoids. When centralized, the gear box has a free running position.

The two solenoids 110 have iron cores 110", while the solenoids 110' have cores of a composite nature, being part of brass 110''' and part of iron 110''''. The solenoids are connected in circuit through a switch 111 with an electrical system, for example of a motor vehicle. The switch 111 has three positions, namely neutral, forward and reverse.

Figure 6:
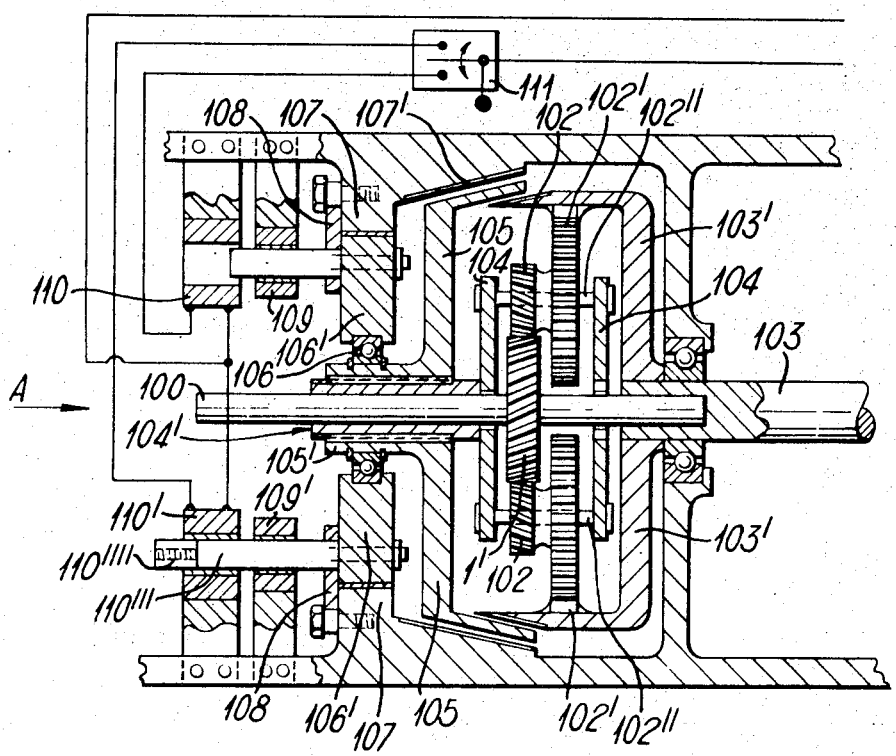
FIG. 6 shows a vertical cross-section showing a schematic view of one half of a gear box including a lay-out for a reversing gear.
Figure 7:
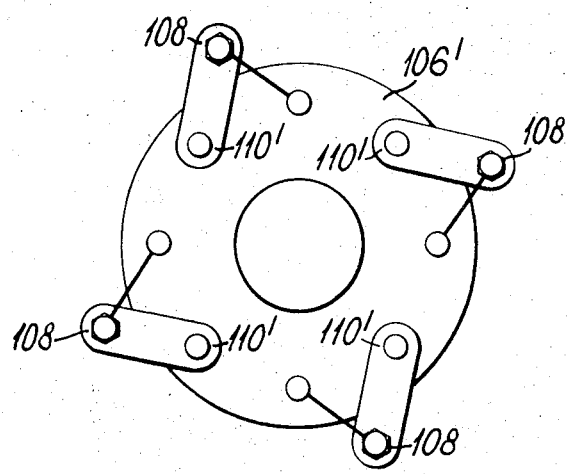
FIG. 7 shows an end view in the direction of the arrow 'A' of part of the gear box shown in FIG. 6.

In operation to engage reverse gear and referring to FIGS. 6 to 8, the switch 111 is set manually to "reverse" whereupon the two opposed solenoids 110 (see FIG. 7) with iron cores are actuated. The cores are attracted to the left, as seen in FIG. 6, from the neutral position shown which action draws the core clutch member 105 leftwardly on the splines of extension 104' to engage the gear teeth 107' of the surrounding member 107 to produce a reverse motion of the output shaft 103.

When it is desired to rotate the shaft 103 in the forward direction, the switch 111 is set to "forward" whereupon the composite cores 110''' and 110'''' are drawn in the opposite direction so that the cone clutch member engages the annular gear wheel 103' so that the output shaft 103 rotates in the same direction as the input sahft 100.

The members 106', 107, 108, 109 and 110 do not rotate and are not therefore subjected to any centrifugal forces.

Referring now to FIG. 1, a hydraulic actuator 201 for actuating the cone clutch member 105 is connected to the cone clutch member as shown in FIG. 6 and comprises a centre zero hydraulic valve 202 which acts on pistons 203 and 204, against the pressure of respective compression springs to move a shaft 207 connected to the cone clutch member to the left or to right when seen in FIG. 6 for a reverse or downward motion.

It will be understood that if the transmission including the reversing gear is mounted in a motor vehicle, the switch 11 could be either a foot or hand switch. In the latter case the switch could be mounted on the fascia adjacent the steering wheel. Motion of the vehicle as desired may then be achieved by slightly opening the throttle and setting the switch to either forward or reverse, when the vehicle could be controlled for movement as little as one inch in the desired direction.

The reversing gear also functions as a safety device, because if the brakes fail when progressing in a forward direction, the switch 11 may be quickly thrown into reverse which results in a movement in the reverse direction.

It will be understood that any suitable ratio of gearing between the various co-operating gear wheels can be utilised. Specific gearings may be used for specific purposes, for example in a vehicle transmission.

The output shaft can therefore drive many kinds of machine or may be directed to any kind of gear box.

It is also to be understood that the electrically operated and hydraulically actuated reverse gear may be replaced by any other suitable system, for example compressed air, vacuum or other methods.

FIG. 10 shows an installation suitable for a private car of about 1,200 cc. engine capacity in which the normal friction disk clutch is removed and infinitely variable speed transmission of the invention is fitted instead.

In FIG. 10, 301 is an input shaft from a prime mover, 302 is an infinitely variable speed transmission as shown in FIG. 2, 303 is a free-wheel outer race secured to a planet carrier side plate, 304 is an output shaft from 302 and has an inner race of the free wheel 303 and a female member mounted thereon. A male member 305 of a clutch is slidable on splines on an input shaft to a standard four speed gear box 306. A spring 307 normally urges member 305 into engagement with the output shaft 304. The gear box 306 has an output shaft 308 to the fuel drive and the clutch is operated by a solenoid 309 operated by a switch 310 on a gear change or on the floor.

With the engine turning at idling speed and with the cone-clutch 305 and low gear engaged, the car will remain stationary until the throttle pedal is depressed slowly or rapidly a very smooth start in the car's motion is obtained.

Next, when about to change gear the switch 310 is depressed thus energizing the solenoid 309 and therefore disengaging the cone clutch 305. The gear change can now be made while the gears are under no-load conditions. When the gear change is completed the switch 310 is released, allowing the return spring 307 to push the cone 305 into full engagement and thereby resuming driving conditions. If it is considered that the returning action of 305 is too rapid, then a simple air damper (not shown) can be fitted to solenoid 309 to slow down this action.

It will now be seen that the driving technique is somewhat similar to driving with an ordinary friction clutch.

The free-wheel 303 allows the planet carrier to overrun the shaft 304 as for instance when the car is stationary and the engine idling, but when the shaft 304 becomes the driving member, then all its motion is paid back to the shaft 301. Therefore the full effectiveness of the engine as a brake is obtained.

It will be understood that the transmission of energy (or torque) from the input shaft 2 to the output shaft 7, in any ratio, does not depend on friction, and thus negligible heat is generated and no special lubrication problems arise. When operative there is dynamic stability in accordance with the loads to which the mechanism is subjected since all the moving parts are disposed symmetrically around the main axis, that is the axis of the input and output shafts. Thus whether the input shaft is slowly or rapidly accelerated from rest, the load on the output shaft will be set in motion gently, due to the characteristics of the transmission.

The transmission is completely automatic in its operation, and using the control lever described in FIG. 3, the performance characteristics may be made responsive to manual control, control responsive to input or output shaft speeds, control responsive to input or output torque, or any desired combination of the above controls.

The transmission is utilisable for any field of operation whether for large or small drives, and at low or high speeds.

It is to be understood that the transmission is simple in design and inexpensive to manufacture in accordance with conventional engineering practice. For example, the various pinions may be simple helical gears of opposite hand made from heated-treated alloy steels.

I claim:
1. An infinitely variable speed transmission comprising:
   a casing, an input shaft rotatably supported on the casing, a first sun wheel nonrotatably mounted on the input shaft, an output shaft coaxial with the input shaft and rotatably supported on said casing, a second sun wheel nonrotatably mounted on the output shaft;

a pair of countershafts disposed in the casing parallel to the common longitudinal axis of the input and output shafts and spaced in diametrically opposed planes in relation to the said common longitudinal axis, said countershafts being rotatably supported on a carrier which itself is supported for rotation relative to said casing and relative to said input and output shafts;

each of the said countershafts nonrotatably mounting thereon first and second planet pinions, said first planet pinion having peripheral gear teeth in co-operative engagement with peripheral gear teeth on said first sun wheel, and said second planet pinion having peripheral gear teeth in co-operative engagement with peripheral gear teeth of the second sun wheel, and a centrifugal fly-weight fixed to each said countershaft, the said first and second planet pinion and the fly-weight mounted on each of said countershafts comprising a planetary assembly, the said two centrifugal fly-weights being mounted within said casing so that their effective masses are opposed, whereby on rotation of the input shaft the respective sun wheels and planet pinions in co-operative engagement rotate and said centrifugal fly-weights also rotate, the effect thereof being to ensure that only positive impulses of load are imposed on the said output shaft, which thereby rotates.

2. An infinitely variable speed transmission as claimed in claim 1, wherein there are two pairs of said planetary assemblies within the said casing whereby there are four of said assemblies disposed symmetrically at 90° radius apart with respect to the said common longitudinal axis.

3. An infinitely variable speed transmission comprising: a casing, an input shaft in the casing, a first sun wheel mounted on the input shaft, an output shaft coaxial with the input shaft and in said casing, and a second sun wheel mounted on the output shaft;

a pair of further shafts in the casing parallel to the common longitudinal axis of the input and output shaft and spaced in diametrically opposed planes in relation to the said common longitudinal axis;

each of the said further shafts mounting longitudinally along its length a first planet pinion having peripheral gear teeth in co-operative engagement with peripheral gear teeth on said first sun wheel, a second planet pinion having peripheral gear teeth in co-operative engagement with peripheral gear teeth of the second sun wheel, and a centrifugal fly-weight solid fixed to its said further shaft, the said first and second planet pinion and the fly-weight mounted on each of said further shafts comprising a planetary assembly, the said two centrifugal fly-weights being mounted within said casing so that their effective masses are opposed;

one of said first and second planet pinions being non-rotatably connected to but axially slideably supported on said further shaft, and spring means coacting between said casing and said one planet pinion for urging said one planet pinion axially of said further shaft;

whereby on rotation of the input shaft the respective sun wheels and planet pinions in co-operative engagement rotate and said centrifugal fly-weights also rotate, the effect thereof being to ensure that only positive impulses of load are imposed on the said output shaft, which thereby rotates.

4. An infinitely variable speed transmission according to claim 3, wherein said spring means includes a compression spring mounted on said further shaft and having one end thereof engaging an inner side of a ball race in which one end of said further shaft is rotatably mounted in said casing, the other end of said spring engaging one axial end face of said second planet pinion, said second planet pinion being mounted for axially sliding on said further shaft.

5. An infinitely variable speed transmission as claimed in claim 4, wherein said peripheral teeth of said engaging sun wheels and planet pinions are helical, the said teeth of one pinion being of opposite hand to said teeth of said co-operating sun wheel.

6. An infinitely variable speed transmission comprising:

a casing, an input shaft in the casing, a first sun wheel mounted on the input shaft, an output shaft coaxial with the input sahft and in said casing, and a second sun wheel mounted on the output shaft;

a pair of further shafts in the casing parallel to the common longitudinal axis of the input and output shaft and spaced in diametrically opposed planes in relation to the said common longitudinal axis;

each of the said further shafts mounting longitudinally along its length a first planet pinion having peripheral gear teeth in cooperative engagement with peripheral gear teeth on said first sun wheel, a second planet pinion having peripheral gear teeth in cooperative engagement with peripheral gear teeth of the second sun wheel, a centrifugal fly-weight fixed to its said further shaft, the said first and second planet pinions and the fly-weight mounted on each of said further shafts comprising a planetary assembly, the said two centrifugal fly-weights being mounted within said casing so that their effective masses are opposed, and means for permitting the radius of the respective center of gravity of each centrifugal fly-weight to be adjusted;

whereby on rotation of the input shaft the respective sun wheels and planet pinions in co-operative engagement rotate and said centrifugal fly-weights also rotate, the effect thereof being to ensure that only positive impulses of load are imposed on the said output shaft, which thereby rotates.

7. An infinitely variable speed transmission comprising:

a casing, an input shaft in the casing, a first sun wheel mounted on the input shaft, an output shaft coaxial with the input shaft and in said casing, and a second sun wheel mounted on the second output shaft;

a pair of further shafts in the casing parallel to the common longitudinal axis of the input and output shaft and spaced in diametrically opposed planes in relation to the said common longitudinal axis;

each of the said further shafts mounting longitudinally along its length a first planet pinion having peripheral gear teeth in co-operative engagement with peripheral gear teeth on said first sun wheel, a second planet pinion having peripheral gear teeth in co-operative engagement with peripheral gear teeth of the second sun wheel, and a centrifugal fly-weight fixed to its said further shaft, the said first and second planet pinion and the fly-weight mounted on each of said further shafts comprising a planetary assembly, the said two centrifugal fly-weights being mounted within said casing so that their effective masses are opposed;

means coacting between said input and output shafts for permitting the direction of rotation of said output shaft to be reversed relative to said input shaft, said coacting means including shiftable clutch means; and whereby on rotation of the input shaft the respective sun wheels and planet pinions in co-operative engagement rotate and said centrifugal fly-weights also rotate, the effect thereof being to ensure that only positive impulses of load are imposed on the said output shaft, which thereby rotates.

8. An infinitely variable speed transmission according to claim 7, wherein said clutch means includes a clutch member mounted on the said input shaft within said casing and capable of axial sliding motion along said common longitudinal axis relative thereto, and means for reciprocating the clutch member between a first and a second operative position whereby the said output shaft is respectively driven in a forward and a reverse direction relative to the direction of rotation of the input shaft.

9. An infinitely variable speed transmission according to claim 8, wherein the said means for reciprocating the said reciprocable clutch member comprises pairs of oppositely acting solenoid members in an electrical circuit.

10. An infinitely variable speed transmission according to claim 8, wherein the said means for reciprocating the said reciprocable clutch member comprise a hydraulic control valve connected via a hydraulic circuit with a double acting piston on the input shaft whereby when hydraulic fluid acts on one face of the piston the clutch member acts in one direction and when a slide valve in said circuit directs fluid to the other face of the piston, the said clutch member acts in the opposite direction.

* * * * *